(12) United States Patent
Wang (10) Patent No.: US 9,001,786 B2
(45) Date of Patent: Apr. 7, 2015

(54) HANDOVER METHODS BETWEEN AN UNLICENSED MOBILE ACCESS NETWORK AND A CELLULAR COMMUNICATION NETWORK AND APPARATUSES THEREOF

(75) Inventor: Hui Wang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 218 days.

(21) Appl. No.: 13/257,505

(22) PCT Filed: Mar. 17, 2010

(86) PCT No.: PCT/CN2010/071093
§ 371 (c)(1),
(2), (4) Date: Sep. 19, 2011

(87) PCT Pub. No.: WO2010/105558
PCT Pub. Date: Sep. 23, 2010

(65) Prior Publication Data
US 2012/0008595 A1    Jan. 12, 2012

(30) Foreign Application Priority Data

Mar. 20, 2009 (CN) .......................... 2009 1 0047991

(51) Int. Cl.
*H04W 36/32* (2009.01)
*H04W 36/38* (2009.01)
*H04W 36/14* (2009.01)

(52) U.S. Cl.
CPC ............ *H04W 36/385* (2013.01); *H04W 36/14* (2013.01); *H04W 36/32* (2013.01)

(58) Field of Classification Search
CPC ... H04W 36/005; H04W 36/14; H04W 36/32; H04W 64/006
USPC .......................... 370/331–334; 455/436–444
See application file for complete search history.

(56) References Cited

U.S. PATENT DOCUMENTS 6,047,181 A * 4/2000 Suonvieri ...................... 455/440

7,395,058 B1 * 7/2008 Kalofonos et al. ............ 455/423
(Continued)

FOREIGN PATENT DOCUMENTS

CN    101010977 A    8/2007
CN    101052221 A    10/2007
(Continued)

OTHER PUBLICATIONS

International Search Report for PCT/CN2010/071093 dated Jun. 24, 2010.
(Continued)

*Primary Examiner* — Khaled Kassim
*Assistant Examiner* — Zhaohui Yang
(74) *Attorney, Agent, or Firm* — Fay Sharpe LLP (57) ABSTRACT

The present invention relates to a handover technology between an unlicensed mobile access network and a cellular communication network. According to a first aspect of the present invention, a method of handing over a communication connection from an unlicensed mobile access network to a cellular communication network in a mobile terminal is provided. The method includes the following steps: acquiring a location information and/or moving direction and/or moving velocity of the mobile terminal (301); determining a handover timing or a handover probability of the handover at least partly according to the location information, moving direction and moving velocity (302); initiating the communication connection between the mobile terminal and the cellular communication network for handover preparation when the handover timing is less than a predetermined value or the handover probability is more than a predetermined value (303); executing the handover (304). By using the method, device and apparatus of the present invention in combination with the positioning-related information of the mobile terminal, handover between an unlicensed mobile access network and a cellular communication network is performed, and thus the handover reliability is improved.

21 Claims, 5 Drawing Sheets

(56) References Cited

U.S. PATENT DOCUMENTS

| | | |
|---|---|---|
| 2002/0068566 A1* | 6/2002 | Ohlsson et al. ............... 455/436 |
| 2006/0121914 A1* | 6/2006 | Kim et al. .................. 455/456.1 |
| 2006/0140150 A1* | 6/2006 | Olvera-Hernandez et al. ............................ 370/331 |
| 2006/0159047 A1* | 7/2006 | Olvera-Hernandez et al. ............................ 370/331 |
| 2006/0227745 A1* | 10/2006 | Olvera-Hernandez et al. ............................ 370/331 |
| 2007/0021127 A1 | 1/2007 | Zheng |
| 2007/0025293 A1 | 2/2007 | Choi |
| 2007/0211664 A1* | 9/2007 | Oyama et al. ................. 370/331 |
| 2008/0107082 A1* | 5/2008 | Igarashi et al. ............... 370/331 |
| 2009/0075660 A1 | 3/2009 | Hallenstal et al. |
| 2009/0191878 A1 | 7/2009 | Hedqvist et al. |
| 2009/0275332 A1 | 11/2009 | Niska et al. |
| 2010/0232389 A1* | 9/2010 | Park .............................. 370/331 |
| 2010/0246532 A1* | 9/2010 | Olvera-Hernandez et al. ............................ 370/331 |

FOREIGN PATENT DOCUMENTS

| | | |
|---|---|---|
| CN | 101077028 A | 11/2007 |
| CN | 101273581 A | 9/2008 |
| JP | 2000-312379 A | 11/2000 |
| JP | 2004-96378 A | 3/2004 |
| JP | 2007-74292 A | 3/2007 |
| JP | 2007-519364 A | 7/2007 |
| JP | 2008-118551 A | 5/2008 |
| WO | WO2007020517 A1 | 2/2007 |
| WO | WO2009011564 A1 | 1/2009 |

OTHER PUBLICATIONS

English Bibliography for JP Pat. App. Publication No. JP2000312379A, published Nov. 7, 2000, in Japanese, printed from Thomson Innovation on Mar. 24, 2013, 3 pp.

English Bibliography for JP Pat. App. Publication No. JP2004096378A, published Mar. 25, 2004, in Japanese, printed from Thomson Innovation on Mar. 24, 2013, 3 pp.

English Bibliography for JP Pat. App. Publication No. JP2007074292A, published Mar. 22, 2007, in Japanese, printed from Thomson Innovation on Mar. 24, 2013, 3 pp.

English Bibliography for JP Pat. App. Publication No. JP2007519364A, published Jul. 12, 2007, in Japanese, printed from Thomson Innovation on Mar. 24, 2013, 3 pp.

English Bibliography for JP Pat. App. Publication No. JP2008118551A, published May 22, 2008, in Japanese, printed from Thomson Innovation on Mar. 24, 2013, 3 pp.

English Bibliography for CN Pat. App. Publication No. CN101010977A, published Aug. 1, 2007, in Chinese, printed from Thomson Innovation on Sep. 18, 2013, 4 pp.

English Bibliography for CN Pat. App. Publication No. CN101052221A, published Oct. 10, 2007, in Chinese, printed from Thomson Innovation on Sep. 18, 2013, 3 pp.

English Bibliography for CN Pat. App. Publication No. CN101077028A, published Nov. 21, 2007, in Chinese, printed from Thomson Innovation on Sep. 18, 2013, 4 pp.

English Bibliography for CN Pat. App. Publication No. CN101273581A, published Sep. 24, 2008, in Chinese, printed from Thomson Innovation on Sep. 18, 2013, 3 pp.

* cited by examiner

HANDOVER METHODS BETWEEN AN UNLICENSED MOBILE ACCESS NETWORK AND A CELLULAR COMMUNICATION NETWORK AND APPARATUSES THEREOF

FIELD OF THE INVENTION

The present invention generally relates to a handover technology of a communication connection in a radio communication network, and more particularly, to a handover technology between different radio communication networks.

BACKGROUND OF THE INVENTION

Figure 1:
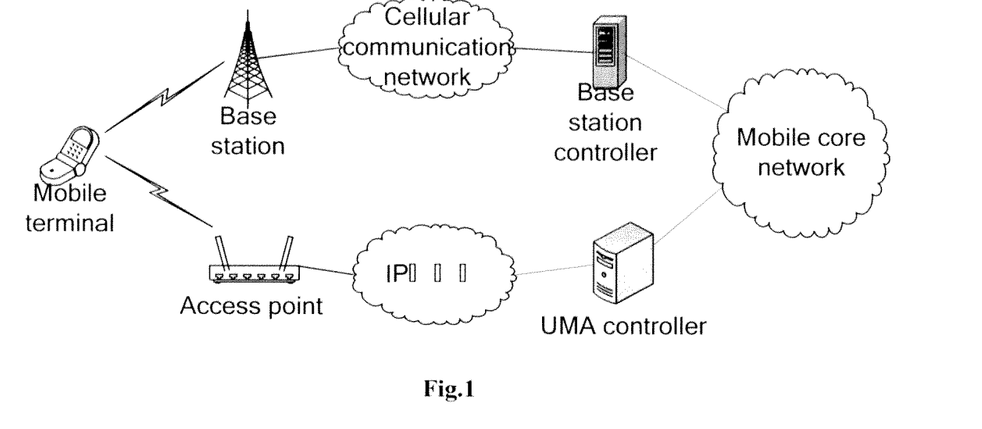
FIG. 1 is a system block diagram illustrating UMA technology.

The unlicensed mobile access (UMA) technology has been put into use more and more widely. FIG. 1 is a system block diagram illustrating UMA technology, wherein a mobile terminal employing UMA technology may perform handover between a cellular communication network and a wireless local area network, e.g., between a GSM network and a WIFI network. In UMA technology, the choice of handover timing from a WIFI network to a GSM network is a problem.

In prior art, the most well-known mechanism of determining handover timing is a mechanism of signal strength threshold. Because of small-scale fading, etc., radio signals are sometimes not stable. Even within the coverage area of a WIFI signal, signal strength received by a mobile terminal in a short period may be low, and thus unnecessary handover will be resulted in. Therefore, the mechanism of signal strength threshold is not reliable enough.

More and more handover mechanisms based on geo-location have come into existence, which are more accurate and reliable than the mechanism of merely signal strength threshold. Some proposals suggest adopting pure WIFI solutions to solve the positioning problem of WIFI equipments. One solution is: establishing a reference point database for a plurality of reference points; storing characteristic data of the plurality of reference points, wherein the data include adjacent access points, received signal strength from a particular access point, etc.; comparing characteristic data of a WIFI equipment with the characteristic data of each reference point to find a most matched reference point and thus determine the location of the WIFI equipment; determining whether or not to perform handover according to the determined location of the WIFI equipment and other conditions, such as received signal strength.

The aforementioned solution, however, has the following disadvantages: 1) the cost is too high to establish a complete and accurate reference point database, especially in a case of a wide coverage application; 2) the characteristic data of different reference points may be so close as to result in erroneous matching and erroneous positioning.

SUMMARY OF THE INVENTION

One important objective of the present invention is to provide a handover technology between an unlicensed mobile access network and a cellular communication network.

According to a first aspect of the present invention, a method of handing over a communication connection from an unlicensed mobile access network to a cellular communication network in a mobile terminal is provided. The method includes the steps of: A. acquiring a location information and/or a moving direction and/or a moving velocity of the mobile terminal; B. determining a handover timing or a handover probability of the handover at least partly according to the location information, the moving direction and the moving velocity; C. initiating a communication connection between the mobile terminal and the cellular communication network for handover preparation when the handover timing is less than a predetermined value or the handover probability is greater than a predetermined value; D. executing the handover.

According to a second aspect of the present invention, a method of handing over a communication connection from an unlicensed mobile access network to a cellular communication network in a mobile terminal is provided. The method includes the steps of A'. acquiring a location information and/or a moving direction and/or a moving velocity of the mobile terminal; B'. sending a message to a handover processing server to notify it of the location information, and/or the moving direction, and/or the moving velocity of the mobile terminal; C'. receiving a first indication message from the handover processing server, wherein the first indication message is used to indicate the mobile terminal to initiate a communication connection with the cellular communication network for handover preparation; D'. initiating the communication connection with the cellular communication network for handover preparation according to the first indication message; F'. executing the handover.

According to a third aspect of the present invention, a method of assisting a mobile terminal to hand over a communication connection from an unlicensed mobile access network to a cellular communication network in a handover processing server is provided. The method includes the steps of receiving a message from the mobile terminal, wherein the message is used to indicate a location information and/or a moving direction and/or a moving velocity of the mobile terminal; b. determining a handover timing or a handover probability of the handover at least partly according to the location information, the moving direction and the moving velocity; c. sending a message according to the handover timing or the handover probability to indicate the mobile terminal to execute the handover.

According to a fourth aspect of the present invention, a first handover apparatus for handing over a communication connection from an unlicensed mobile access network to a cellular communication network in a mobile terminal is provided. The first handover apparatus includes: a positioning-related information acquiring device for acquiring a location information and/or a moving direction and/or a moving velocity of the mobile terminal; a parameter determining device for determining a handover timing or a handover probability of the handover at least partly according to the location information, the moving direction and the moving velocity; a first initiating device for initiating a communication connection between the mobile terminal and the cellular communication network for handover preparation when the handover timing is less than a predetermined value or the handover probability is greater than a predetermined value; a first executing device for executing the handover.

According to a fifth aspect of the present invention, a second handover apparatus for handing over a communication connection from an unlicensed mobile access network to a cellular communication network in a mobile terminal is provided. The second handover apparatus includes: a positioning-related information acquiring device for acquiring a location information and/or a moving direction and/or a moving velocity of the mobile terminal; a positioning-related information sending device for sending a message to a handover processing server to notify it of the location information, and/or the moving direction, and/or the moving velocity of the mobile terminal; a first indication message receiving device for receiving a first indication message from the handover processing server, wherein the first indication message is used to indicate the mobile terminal to initiate a communication connection with the cellular communication network for handover preparation; a second initiating device for initiating the communication connection with the cellular communication network for handover preparation according to the first indication message; a second executing device for executing the handover.

According to a sixth aspect of the present invention, a handover assisting apparatus for assisting a mobile terminal to hand over a communication connection from an unlicensed mobile access network to a cellular communication network in a handover processing server is provided. The handover assisting apparatus includes: a positioning-related information receiving device for receiving a message from the mobile terminal, wherein the message is used to indicate a location information and/or a moving direction and/or a moving velocity of the mobile terminal; a parameter determining device for determining a handover timing or a handover probability of the handover at least partly according to the location information, the moving direction and the moving velocity; an indication message sending device for sending a message according to the handover timing or the handover probability to indicate the mobile terminal to execute the handover.

According to a seventh aspect of the present invention, a mobile terminal is provided. The mobile terminal includes the first handover apparatus of the fourth aspect of the present invention, and/or the second handover apparatus of the fifth aspect of the present invention.

According to an eighth aspect of the present invention, a handover processing server is provided. The handover processing server includes the handover assisting apparatus of the sixth aspect of the present invention.

By using the method, apparatus, and equipment of the present invention in combination with the positioning-related information of the mobile terminal, handover between an unlicensed mobile access network and a cellular communication network is performed, and thus the handover reliability is improved.

BRIEF DESCRIPTION OF THE DRAWINGS

Other features, objectives and advantages of the present invention will become more apparent after reading the following detailed description of non-limiting embodiments, with reference to the attached drawings, wherein below.

Wherein the same or similar reference numerals represent the same or similar step features or devices (modules).

DETAILED DESCRIPTION OF PREFERRED EMBODIMENTS

Figure 2:
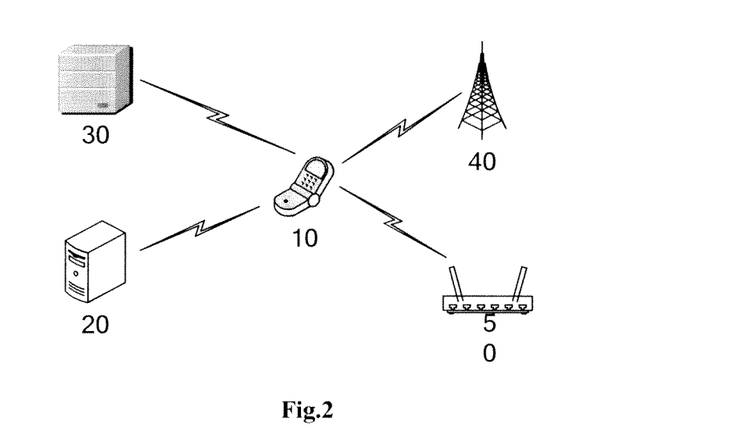
FIG. 2 is a system block diagram illustrating a radio communication system according to an embodiment of the present invention.

FIG. 2 is a system block diagram illustrating a radio communication system according to an embodiment of the present invention. As shown in FIG. 2, the radio communication system in the embodiment includes a mobile terminal 10, a base station 40, an access point 50, a GPS positioning and navigation equipment 30, and a handover processing server 20. The mobile terminal 10 accesses a cellular communication network, such as a GSM network, via the base station 40, and accesses an unlicensed mobile access network, such as a WIFI network, via the access point 50. Of course, the unlicensed mobile access network is not limited to a WIFI network, and the cellular communication network is also not limited to a GSM network.

The GPS positioning and navigation equipment 30 is configured to provide the mobile terminal 10 with positioning-related information, such as location information, moving direction, moving velocity, etc. It will be understood by those skilled in the art that a GLONASS positioning and navigation equipment or a Galileo positioning and navigation equipment may be substituted for the GPS positioning and navigation equipment 30. Some mobile communication systems can provide positioning service by themselves. Thus, according to some other embodiments of the present invention, the cellular communication network or unlicensed mobile access network in the system may provide the mobile terminal 10 with positioning service and the GPS positioning and navigation equipment 30 is dispensable in such a system.

The handover processing server 20 is configured to determine a handover timing, etc., for the mobile terminal 10. In some other embodiments of the present invention, the functionality of determining the handover timing, etc., is accomplished by the mobile terminal 10 itself, and the handover processing server 20 is dispensable in such a system.

Figure 3:
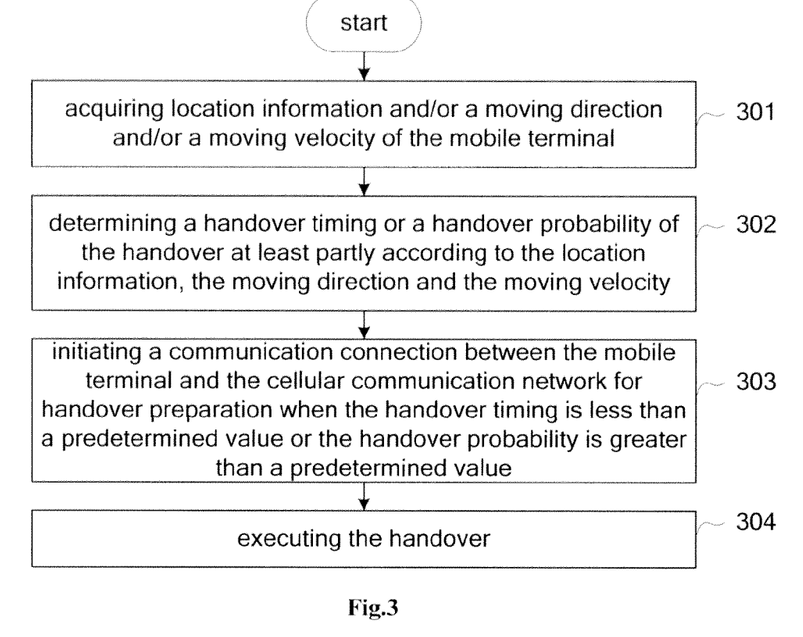
FIG. 3 is a flowchart illustrating a method of handing over a communication connection from an unlicensed mobile access network to a cellular communication network in a mobile terminal according to an embodiment of the present invention.

FIG. 3 is a flowchart illustrating a method of handing over a communication connection from an unlicensed mobile access network to a cellular communication network in a mobile terminal according to an embodiment of the present invention. In this embodiment, the handover timing, etc., is determined by the mobile terminal 10 itself. Referring to FIG. 2, the system in this embodiment includes the mobile terminal 10, the base station accessed to a GSM network and the access point accessed to a WIFI network, and doesn't include the handover processing server.

In the step 301, the mobile terminal 10 acquires its positioning-related information including its location information and/or moving velocity and/or moving direction. According to different specific implementations, the positioning-related information of the mobile terminal 10 may be acquired from a global navigation satellite system, or from the GSM network or the WIFI network in the system. And preferably, the positioning-related information is updated in real time.

In the step 302, the mobile terminal 10 determines the handover timing or a handover probability of the handover from a WIFI network to a GSM network at least partly according to its location information, moving direction, and moving velocity.

In the step 303 the mobile terminal 10 initiates a communication connection with the GSM network according to a communication connection with the WIFI network for handover preparation when the mobile terminal 10 judges that the handover timing is less than a predetermined value or the handover probability is greater than a predetermined value.

In the step 304, the mobile terminal 10 hands over the communication connection from the WIFI network to the GSM network.

Figure 4:
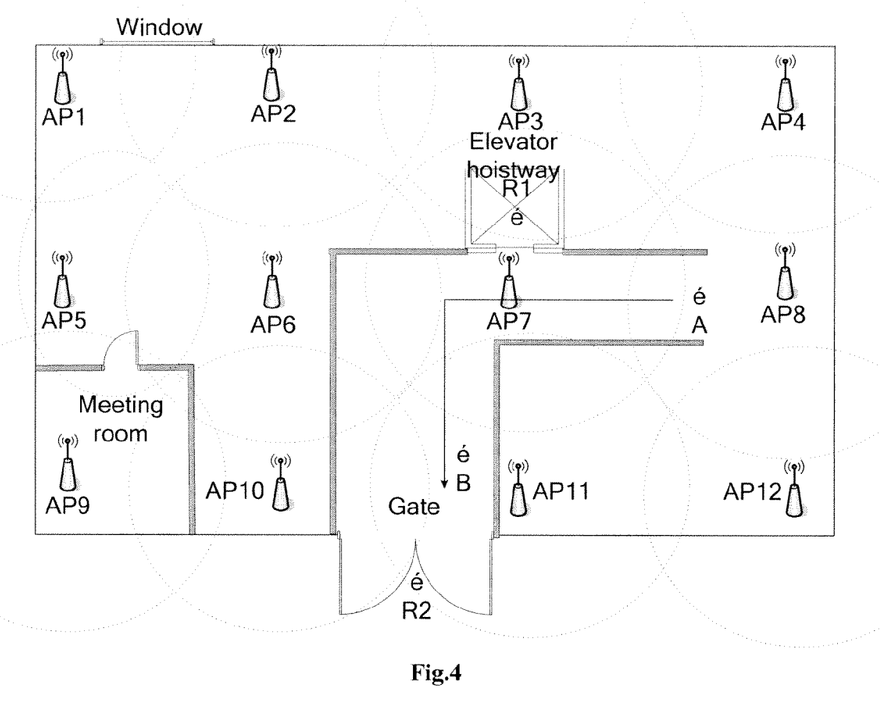
FIG. 4 is a schematic diagram illustrating an electronic map of an unlicensed mobile access network according to an embodiment of the present invention.

According to an embodiment of the present invention, the mobile terminal 10 is configured with an electronic map of the unlicensed mobile access network. FIG. 4 is a schematic diagram illustrating such an electronic map. As shown in FIG. 4, a WIFI network is disposed in an office. The network includes a plurality of access points, i.e., AP1 to AP12 in the figure. The exits from the office to the outside of the coverage area of the WIFI network signal include a gate and an elevator door. The closer the mobile terminal 10 is to the gate and the elevator door, the more possibly it leaves the coverage area of the WIFI network signal. In the electronic map, a handover reference point is disposed nearby each of the gate and the elevator door, i.e., R1 and R2. Preferably, the handover reference points are disposed at the side which is nearby the exits and a little bit far away from the coverage area of the WIFI network signal.

The handover timing or the handover probability determined by the mobile terminal 10 is a parameter for handover decision. Specifically, the handover timing t is proportional to a distance d between the mobile terminal 10 and a current handover reference point, and inversely proportional to a moving velocity v of the mobile terminal 10 toward the current handover reference point, wherein d may be determined by the location information of the mobile terminal 10 and the current handover reference point, and v may be determined by the location information of the current handover reference point, and the location information, the moving velocity, and the moving direction of the mobile terminal 10. Usually, the handover probability p is also a function of d and v. The handover probability p decreases when the moving velocity v of the mobile terminal 10 toward the current handover reference point decreases, and increases when the distance d between the mobile terminal 10 and the current handover reference point decreases.

Preferably, the current handover reference point is a handover reference point that is closer to the mobile terminal 10. For example, when the mobile terminal 10 is located at Point A, the current handover reference point is R1. When the mobile terminal 10 moves from Point A to Point B, the current handover reference point is changed from R1 to R2.

The mobile terminal 10 initiates a communication connection with the GSM network according to a communication connection with the WIFI network for handover preparation when the mobile terminal 10 judges that the handover timing is less than a predetermined value, e.g. 2 seconds, or the handover probability is greater than a predetermined value, e.g. 0.9.

According to one implementation, the mobile terminal 10 hands over the communication connection from the WIFI network to the GSM network after the communication connection with the GSM network is established.

According to another implementation, the mobile terminal 10 makes the handover decision according to the received signal strength from each access point as well. For example, the mobile terminal 10 won't hand over the communication connection from the WIFI network to the GSM network until received signal strength indicators (RSSIs) from all of the access points are less than a predetermined value. In this way, erroneous handovers can be further reduced. An example of such erroneous handovers may happen when the mobile terminal 10 is very close to the handover reference point R1 during the process of moving from Point A to Point B.

According to an embodiment of the present invention, at least one associated edge access point is determined for each handover reference point in the electronic map. Usually, the edge access point is an access point closest to the handover reference point. For example, the access point AP7 is determined as an edge access point associated with the handover reference point R1, and the access points AP10 and AP11 are determined as edge access points associated with the handover reference point R2. In that office, it means that the mobile terminal 10 is far away from the handover reference point when the mobile terminal 10 fails to receive a signal from the edge access point, and thus the probability that handover may happen is low.

Specifically, the following formula can be adopted to determine the handover probability p: $p=p_{edge} \times p_{direction}$. Here, $p_{edge}$ represents a probability relating to edge access points. For example, when the mobile terminal 10 fails to receive a signal from any edge access point, $p_{edge}=0$; when it receives a signal from any edge access point, $p_{edge}=1$. And $p_{direction}$ may be a function of the distance d between the mobile terminal 10 and the current handover reference point, and the moving velocity v of the mobile terminal 10 toward the current handover reference point. The value of $p_{direction}$ decreases when the moving velocity v of the mobile at 10 toward the current handover reference point decreases, and increases when the distance d between the mobile terminal 10 and the current handover reference point decreases. By design of the formula, the value of the handover probability p can fall in a range from 0 to 1.

The mobile terminal 10 initiates a communication connection with the GSM network according to a communication connection with the WIFI network for handover preparation when the mobile terminal 10 judges that the handover probability p is greater than a predetermined value, e.g. 0.9.

Preferably, the mobile terminal 10 makes the handover decision according to the received signal strength from the edge access point associated with the current handover reference point as well. For example, assuming the current handover reference point to be R1, the mobile terminal 10 won't hand over the communication connection from the WIFI network to the GSM network until a received signal strength indicator (RSSI) from the access point AP7 is less than a predetermined value. In this way, erroneous handovers can be further reduced. An example of such erroneous handovers may happen when the mobile terminal 10 is very close to the handover reference point R1 during the process of moving from Point A to Point B.

Figure 5:
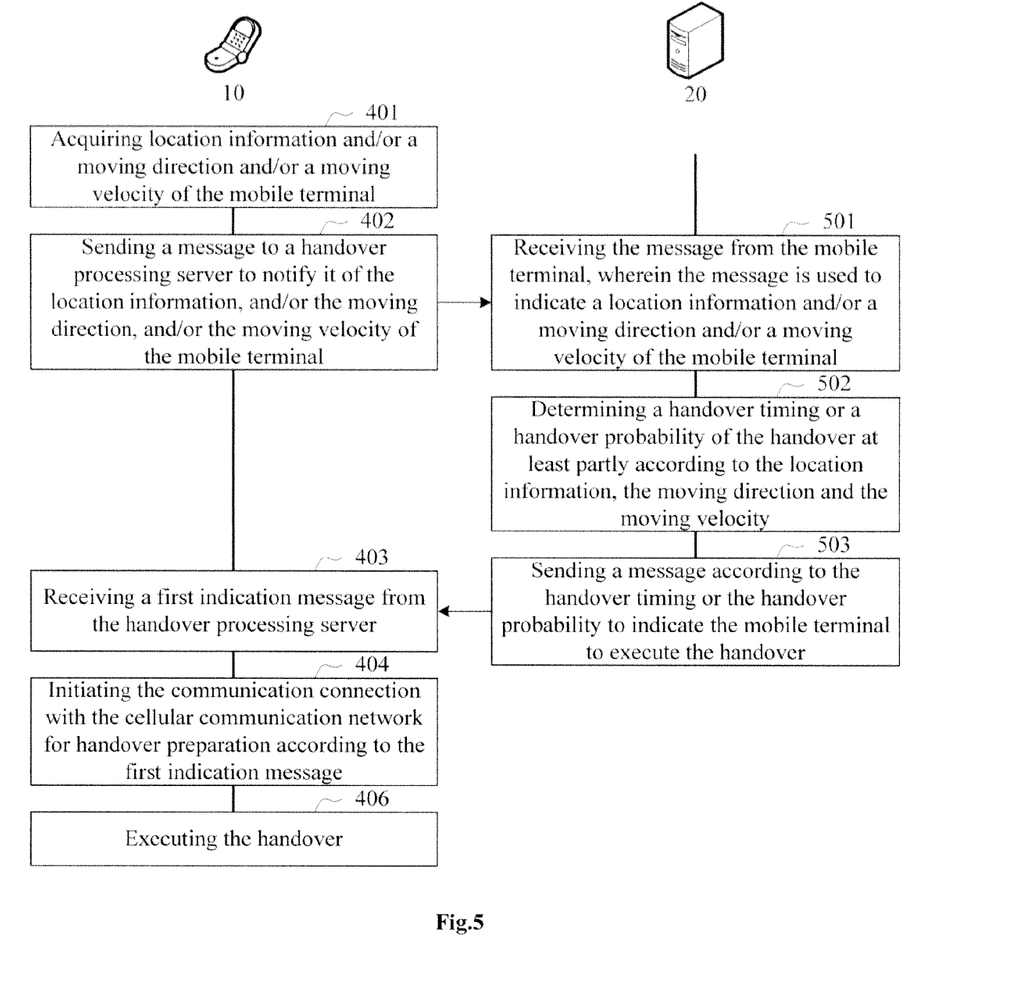
FIG. 5 is a flowchart illustrating a method of assisting a mobile terminal to hand over a communication connection from an unlicensed mobile access network to a cellular communication network by a handover processing server according to an embodiment of the present invention.

FIG. 5 is a flowchart illustrating a method of assisting a mobile terminal to hand over a communication connection from an unlicensed mobile access network to a cellular communication network by a handover processing server according to an embodiment of the present invention. In this embodiment, the handover processing server assists the mobile terminal to determine the handover timing, etc. Referring to FIG. 2, the system in this embodiment includes the mobile terminal 10, the handover processing server 20, the base station accessed to a GSM network and the access point accessed to a WIFI network.

In the step 401, the mobile terminal 10 acquires its positioning-related information including its location information and/or moving velocity and/or moving direction. According to different specific implementations, the positioning-related information of the mobile terminal 10 may be acquired from a global navigation satellite system, or from the GSM network or the WIFI network in the system. And preferably, the positioning-related information is updated in real time.

In the step 402, the mobile terminal 10 sends a message to the handover processing server 20 to notify it of the location information and/or the moving velocity and/or the moving direction of the mobile terminal 10.

In the step 501, the handover processing server 20 receives the message from the mobile terminal 10 indicating its positioning-related information wherein the information includes location information and/or a moving velocity and/or a moving direction of the mobile terminal 10.

In the step 502, the handover processing server 20 determines a handover timing or a handover probability of the handover from the WIFI network to the GSM network at least partly according to the location information, the moving direction and the moving velocity of the mobile terminal 10.

In the step 503, the handover processing server 20 sends a message according to the handover timing or the handover probability to indicate the mobile terminal 10 to execute the handover. Specifically, the handover processing server 20 sends a first indication message to indicate the mobile terminal 10 to initiate a communication connection with the GSM network according to a communication connection with the WIFI network for handover preparation, when the handover processing server 20 judges that the handover timing is less than a predetermined value or the handover probability is greater than a predetermined value.

In the step 403, the mobile terminal 10 receives the first indication message from the handover processing server 20.

In the step 404, the mobile terminal 10 initiates the communication connection with the cellular communication network for handover preparation according to the first indication message.

In the step 406, the mobile terminal 10 hands over the communication connection from the WIFI network to the GSM network.

According to one implementation, the mobile terminal 10 hands over the communication connection from the WIFI network to the GSM network after the communication connection with the GSM network is established.

According to another implementation, the handover processing server 20 further sends a second indication message to indicate the mobile terminal 10 to determine the handover. When receiving the second indication message from the handover processing server 20, the mobile terminal 10 hands over the communication connection from the WIFI network to the GSM network.

Specifically, the step 402 may be executed periodically, e.g., once per second.

Preferably, the step 402 is executed by the mobile terminal 10 according to a request from the handover processing server 20. Each time when the mobile terminal 10 receives a request for positioning-related information from the handover processing server 20, the step 402 is executed to notify the handover processing server 20 of the updated positioning-related information. The handover processing server 20 may send the request periodically. And more preferably, the handover processing server 20 adjusts the frequency of sending the request for positioning-related information according to the determined handover timing or handover probability. When the handover probability is low, e.g. less than 0.3, or the handover timing is great, e.g. greater than 10 seconds, the handover processing server 20 sends the aforementioned request with low frequency; when the handover probability increases, or the handover timing decreases, the handover processing server 20 raises the frequency of sending the aforementioned request. In this way, the update frequency of positioning-related information of the mobile terminal 10 can be adapted to the change in the probability that handover may happen, and thus network resources are saved and life time of the battery of the mobile terminal 10 is extended.

According to an embodiment of the present invention, the handover processing server 20 is configured with an electronic map of the unlicensed mobile access network. FIG. 4 is a schematic diagram illustrating the electronic map in the embodiment.

The handover timing or the handover probability determined by the handover processing server 20 is a parameter for handover decision. Specifically, the handover timing t is proportional to a distance d between the mobile terminal 10 and a current handover reference point, and inversely proportional to a moving velocity v of the mobile terminal 10 toward the current handover reference point, wherein d may be determined by the location information of the mobile terminal 10 and the current handover reference point, and v may be determined by the location information of the current handover reference point, and the location information, the moving velocity, and the moving direction of the mobile terminal 10. Usually, the handover probability p is also a function of d and v. The handover probability p decreases when the moving velocity v of the mobile terminal 10 toward the current handover reference point decreases, and increases when the distance d between the mobile terminal 10 and the current handover reference point decreases. By design of the formula, the value of the handover probability p can fall in a range from 0 to 1.

Preferably, the current handover reference point is a handover reference point that is closer to the mobile terminal 10. For example, when the mobile terminal 10 is located at Point A, the current handover reference point is D). When the mobile terminal 10 moves from Point A to Point B, the current handover reference point is changed from R1 to R2.

The handover processing server 20 sends the first indication message to the mobile terminal 10 to indicate it to initiate a communication connection with the GSM network for handover preparation, when the handover processing server 20 judges that the handover timing is less than a predetermined value, e.g. 2 seconds, or the handover probability is greater than a predetermined value e.g. 0.9.

Preferably, the mobile terminal 10 further periodically notifies the handover processing server 20 of a received signal strength from each access point. When judging that received signal strength indicators (RSSIs) from all of the access points are less than a predetermined value, the handover processing server 20 sends the second indication message to the mobile terminal 10 to indicate it to determine the handover. In this way, erroneous handovers can be further reduced. An example of such erroneous handovers may happen when the mobile terminal 10 is very close to the handover reference point R1 during the process of moving from Point A to Point B.

According to an embodiment of the present invention, at least one associated edge access point is determined for each handover reference point in the electronic map. Usually, the edge access point is an access point closest to the handover reference point. For example, the access point AP7 is determined as an edge access point associated with the handover reference point R1, and the access points AP10 and AP11 are determined as edge access points associated with the handover reference point R2. In that office, it means that the mobile terminal 10 is far away from the handover reference point when the mobile terminal 10 fails to receive a signal from the edge access point, and thus the probability that handover may happen is low.

Specifically, the following formula can be adopted to determine the handover probability p: $p = p_{edge} \times p_{direction}$. Here, $p_{edge}$ represents a probability relating to edge access points. For example, when the mobile terminal 10 fails to receive a signal from any edge access point, $p_{edge}=0$; when it receives a signal from any edge access point, $p_{edge}=1$. And $p_{direction}$ may be a function of the distance d between the mobile terminal 10 and the current handover reference point, and the moving velocity v of the mobile terminal 10 toward the current handover reference point. The value of $p_{direction}$ decreases when the moving velocity v of the mobile terminal 10 toward the current handover reference point decreases, and increases when the distance d between the mobile terminal 10 and the current handover reference point decreases. By design of the formula, the value of the handover probability p can fall in a range from 0 to 1.

The handover processing server 20 sends the first indication message to the mobile terminal 10, when the handover processing server 20 judges that the handover probability p is greater than a predetermined value.

Preferably, the handover processing server 20 makes the handover decision according to the received signal strength from the edge access point associated with the current handover reference point received by the mobile terminal 10 as well. For example, assuming the current handover reference point to be R1, the handover processing server 20 won't send the second indication message to indicate the mobile terminal 10 to hand over the communication connection from the WIFI network to the GSM network until a received signal strength indicator (RSSI) from the access point AP7 is less than a predetermined value. In this way, erroneous handovers can be further reduced. An example of such erroneous handovers may happen when the mobile terminal 10 is very close to the handover reference point R1 during the process of moving from Point A to Point B.

Figure 6:
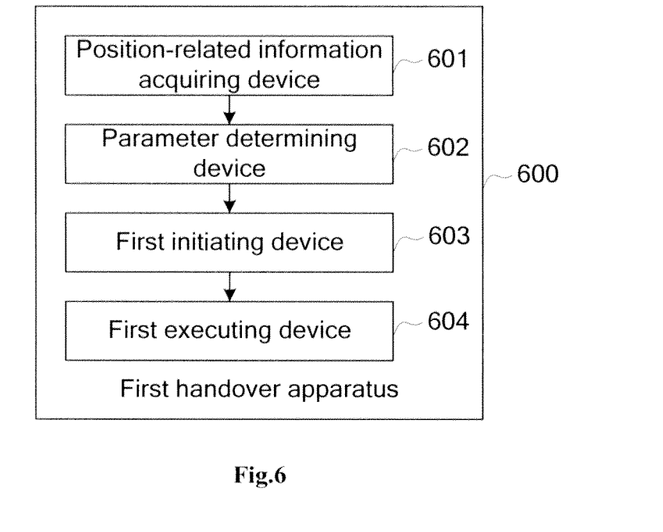
FIG. 6 is a structural block diagram illustrating a first handover apparatus for handing over a communication connection from an unlicensed mobile access network to a cellular communication network in a mobile terminal according to an embodiment of the present invention.

FIG. 6 is a structural diagram illustrating a first handover apparatus for handing over a communication connection from an unlicensed mobile access network to a cellular communication network in a mobile terminal according to an embodiment of the present invention. In this embodiment, the handover timing, etc., is determined by the mobile terminal itself. Referring to FIG. 2, the system in this embodiment includes the mobile terminal 10, the base station accessed to a GSM network and the access point accessed to a WIFI network, and doesn't include the handover processing server. As shown in FIG. 6, a first handover apparatus 600 includes a positioning-related information acquiring device 601, a parameter determining device 602, a first initiating device 603 and a first executing device 604. The first handover apparatus 600 is typically disposed in the mobile terminal 10.

Firstly, the positioning-related information acquiring device 601 acquires positioning-related information of the mobile terminal 10, and the positioning-related information includes location information and/or a moving velocity and/or a moving direction of the mobile terminal 10. According to different specific implementations, the positioning-related information of the mobile terminal 10 may be acquired from a global navigation satellite system, or from the GSM network or the WIFI network in the system. And preferably, the positioning-related information is updated in real time.

And then, the parameter determining device 602 determines a handover timing or a handover probability of the handover from the WIFI network to the GSM network at least partly according to the location information, the moving direction and the moving velocity of the mobile terminal 10.

And then, the first initiating device 603 initiates a communication connection between the mobile terminal 10 and the GSM network according to a communication connection between the mobile terminal 10 and the WIFI network for handover preparation, when the first initiating device 603 judges that the handover timing is less than a predetermined value or the handover probability is greater than a predetermined value.

And then, the first executing device 604 hands over the communication connection from the WIFI network to the GSM network.

According to an embodiment of the present invention, the first handover apparatus 600 of the mobile terminal 10 is configured with an electronic map of the unlicensed mobile access network. FIG. 4 is a schematic diagram illustrating such an electronic map. As shown in FIG. 4, a WIFI network is disposed in an office. The network includes a plurality of access points, i.e., AP1 to AP12 in the figure. The exits from the office to the outside of the coverage area of the WIFI network signal include a gate and an elevator door. The closer the mobile terminal 10 is to the gate and the elevator door, the more possibly it leaves the coverage area of the WIFI network signal. In the electronic map, a handover reference point is disposed nearby each of the gate and the elevator door, i.e., R1 and R2. Preferably, the handover reference points are disposed at the side which is nearby the exits and a little bit far away from the coverage area of the WIFI network signal.

The handover timing or the handover probability determined by the parameter determining device 602 is a parameter for handover decision. Specifically, the handover timing t is proportional to a distance d between the mobile terminal 10 and a current handover reference point, and inversely proportional to a moving velocity v of the mobile terminal 10 toward the current handover reference point, wherein d may be determined by the location information of the mobile terminal 10 and the current handover reference point, and v may be determined by the location information of the current handover reference point, and the location information, the moving velocity, and the moving direction of the mobile terminal 10. Usually, the handover probability p is also a function of d and v. The handover probability p decreases when the moving velocity v of the mobile terminal 10 toward the current handover reference point decreases, and increases when the distance d between the mobile terminal 10 and the current handover reference point decreases. By design of the formula, the value of the handover probability p can fall in a range from 0 to 1.

Preferably, the current handover reference point is a handover reference point that is closer to the mobile terminal 10. For example, when the mobile terminal 10 is located at Point A, the current handover reference point is R1. When the mobile terminal 10 moves from Point A to Point B, the current handover reference point is changed from R1 to R2.

The first initiating device 603 initiates a communication connection between the mobile terminal 10 and the GSM network according to a communication connection between the mobile terminal 10 and the WIFI network for handover preparation, when the first initiating device 603 judges that the handover timing is less than a predetermined value, e.g. 2 seconds, or the handover probability is greater than a predetermined value e.g. 0.9.

According to one implementation, the first executing device 604 hands over the communication connection from the WIFI network to the GSM network after the communication connection with the GSM network is established.

According to another implementation, the first executing device 604 makes the handover decision according to the received signal strength from each access point received by the mobile terminal 10 as well. For example, the first executing device 604 won't hand over the communication connection from the WIFI network to the GSM network until received signal strength indicators (RSSIs) from all of the access points are less than a predetermined value. In this way, erroneous handovers can be further reduced. An example of such erroneous handovers may happen when the mobile terminal 10 is very close to the handover reference point R1 during the process of moving from Point A to Point B.

According to an embodiment of the present invention, at least one associated edge access point is determined for each handover reference point in the electronic map. Usually, the edge access point is an access point closest to the handover reference point. For example, the access point AP7 is determined as an edge access point associated with the handover reference point R1, and the access points AP10 and AP11 are determined as edge access points associated with the handover reference point R2. In that office, it means that the mobile terminal 10 is far away from the handover reference point when the mobile terminal 10 fails to receive a signal from the edge access point, and thus the probability that handover may happen is low.

Specifically, the following formula can be adopted to determine the handover probability p: $p=p_{edge} \times p_{direction}$. Here, $p_{edge}$ represents a probability relating to edge access points. For example, when the mobile terminal 10 fails to receive a signal from any edge access point, $p_{edge}=0$; when it receives a signal from any edge access point, $p_{edge}=1$. And $p_{direction}$ may be a function of the distance d between the mobile terminal 10 and the current handover reference point, and the moving velocity v of the mobile terminal 10 toward the current handover reference point. The value of $p_{direction}$ decreases when the moving velocity v of the mobile terminal 10 toward the current handover reference point decreases, and increases when the distance d between the mobile terminal 10 and the current handover reference point decreases. By design of the formula, the value of the handover probability p can fall in a range from 0 to 1.

The first initiating device 603 initiates a communication connection with the GSM network according to a communication connection between the mobile terminal 10 and the WIFI network for handover preparation, when the first initiating device 603 judges that the handover probability p is greater than a predetermined value.

Preferably, the first executing device 604 makes the handover decision according to the received signal strength from the edge access point associated with the current handover reference point received by the mobile terminal 10 as well. For example, assuming the current handover reference point to be R1 the first executing device 604 won't hand over the communication connection from the WIFI network to the GSM network until a received signal strength indicator (RSSI) from the access point AP7 is less than a predetermined value. In this way, erroneous handovers can be further reduced. An example of such erroneous handovers may happen when the mobile terminal 10 is very close to the handover reference point R1 during the process of moving from Point A to Point B.

Figure 7:
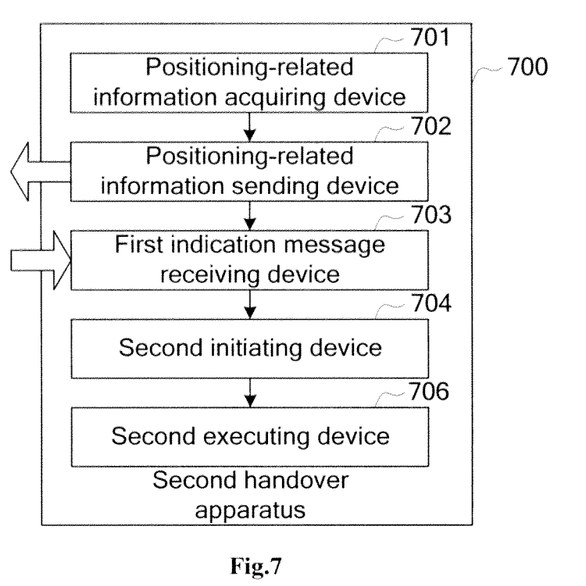
FIG. 7 is a structural block diagram illustrating a second handover apparatus for handing over a communication connection from an unlicensed mobile access network to a cellular communication network in a mobile terminal according to an embodiment of the present invention.
Figure 8:
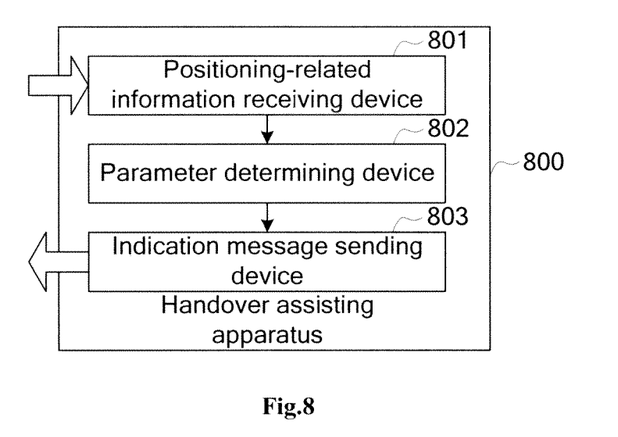
FIG. 8 is a structural block diagram illustrating a handover assisting apparatus for assisting a mobile terminal to hand over a communication connection from an unlicensed mobile access network to a cellular communication network in a handover processing server according to an embodiment of the present invention.

In another embodiment of the present invention, a handover processing server assists the mobile terminal to determine the handover timing, etc. Referring to FIG. 2, the system in this embodiment includes the mobile terminal 10, the handover processing server 20, the base station accessed to a GSM network and the access point accessed to a WIFI network. FIG. 7 is a structural block diagram illustrating a second handover apparatus for handing over a communication connection from an unlicensed mobile access network to a cellular communication network in a mobile terminal according to the embodiment. FIG. 8 is a structural block diagram illustrating a handover assisting apparatus for assisting the mobile terminal to hand over a communication connection from an unlicensed mobile access network to a cellular communication network in the handover processing server according to the embodiment. As shown in FIG. 7, the second handover apparatus 700 includes a positioning-related information acquiring device 701, a positioning-related information sending device 702, a first indication message receiving device 703, a second initiating device 704 and a second executing device 706. As shown in FIG. 8, the handover assisting apparatus 800 includes a positioning-related information receiving device 801, a parameter determining device 802, and an indication message sending device 803. The second handover apparatus 700 is typically disposed in the mobile terminal 10, and the handover assisting apparatus 800 is typically disposed in the handover processing server 20.

Firstly, the positioning-related information acquiring device 701 acquires positioning-related information of the mobile terminal 10, and the positioning-related information includes location information and/or a moving velocity and/or a moving direction of the mobile terminal 10. According to different specific implementations, the positioning-related information of the mobile terminal 10 may be acquired from a global navigation satellite system, or from the GSM network or the WIFI network in the system. And preferably, the positioning-related information updated in real time.

Then, the positioning-related information sending device 702 sends a message to the handover processing server 20 to notify it of the location information, and/or the moving velocity, and/or the moving direction of the mobile terminal 10.

In the handover processing server 20, the positioning-related information receiving device 801 receives the message from the mobile terminal 10 indicating its positioning-related information, wherein the information includes location information and/or a moving velocity and/or a moving direction of the mobile terminal 10. Then, the parameter determining device 802 determines a handover timing or a handover probability of the handover from the WIFI network to the GSM network at least partly according to the location information, the moving direction and the moving velocity of the mobile terminal 10. Then, the indication message sending device 803 sends a message according to the handover timing or the handover probability to indicate the mobile terminal 10 to execute the handover. Specifically, the indication message sending device 803 sends a first indication message to indicate the mobile terminal 10 to initiate a communication connection with the GSM network according to a communication connection with the WIFI network for handover preparation, when it is judged that the handover timing is less than a predetermined value or the handover probability is greater than a predetermined value.

In the mobile terminal 10, the first indication message receiving device 703 receives the first indication message from the handover processing server 20. Then, the second initiating device 704 initiates the communication connection between the mobile terminal 10 and the GSM network for handover preparation according to the first indication message. Then, the second executing device 706 hands over the communication connection from the WIFI network to the GSM network.

According to one implementation, the second executing device 706 in the mobile terminal 10 hands over the communication connection from the WIFI network to the GSM network after the communication connection with the GSM network is established.

According to another implementation, the indication message sending device 803 in the handover processing server 20 further sends a second indication message to indicate the mobile terminal 10 to determine the handover. The second handover apparatus 700 in the mobile terminal 10 further includes a second indication message receiving device (not shown). When the second indication message receiving device receives the second indication message from the handover processing server 20, the second executing device 706 hands over the communication connection from the WIFI network to the GSM network.

Specifically, the notification of the updated positioning-related information to the handover processing server 20 by the positioning-related information sending device 702 in the mobile terminal 10 may be executed periodically, e.g., once per second.

Preferably, the notification of the updated positioning-related information to the handover processing server 20 is executed by the positioning-related information sending device 702 in the mobile terminal 10 according to a request from the handover processing server 20. Each time when the mobile terminal 10 receives a request for positioning-related information from the handover processing server 20, the positioning-related information sending device 702 notifies the handover processing server 20 of the updated positioning-related information. The handover processing server 20 may send the request periodically. And more preferably, the handover processing server 20 adjusts the frequency of sending the request for positioning-related information according to the determined handover timing or handover probability. When the handover probability is low, e.g. less than 0.3, or the handover timing is great, e.g. greater than 10 seconds, the handover processing server 20 sends the aforementioned request with low frequency; when the handover probability increases, or the handover timing decreases, the handover processing server 20 raises the frequency of sending the aforementioned request. In this way, the update frequency of positioning-related information of the mobile terminal 10 can be adapted to the change in the probability that handover may happen, and thus network resources are saved and life time of the battery of the mobile terminal 10 is extended.

According to an embodiment of the present invention, the handover assisting apparatus 800 of the handover processing server 20 is configured with an electronic map of the unlicensed mobile access network. FIG. 4 is a schematic diagram illustrating the electronic map in the embodiment.

The handover timing or the handover probability determined by the parameter determining device 802 in the handover processing server 20 is a parameter for handover decision. Specifically, the handover timing t is proportional to a distance d between the mobile terminal 10 and a current handover reference point, and inversely proportional to a moving velocity v of the mobile terminal 10 toward the current handover reference point, wherein d may be determined by the location information of the mobile terminal 10 and the current handover reference point, and v may be determined by the location information of the current handover reference point, and the location information, the moving velocity, and the moving direction of the mobile terminal 10. Usually, the handover probability p is also a function of d and v. The handover probability p decreases when the moving velocity v of the mobile terminal 10 toward the current handover reference point decreases, and increases when the distance d between the mobile terminal 10 and the current handover reference point decreases. By design of the formula, the value of the handover probability p can fall in a range from 0 to 1.

Preferably, the current handover reference point is a handover reference point that is close to the mobile terminal 10. For example, when the mobile terminal 10 is located at Point A, the current handover reference point is R1. When the mobile terminal 10 moves from Point A to Point B, the current handover reference point is changed from R1 to R2.

In the handover processing server 20, the indication message sending device 803 sends a first indication message to the mobile terminal 10 to indicate it to initiate a communication connection with the GSM network for handover preparation, when the indication message sending device 803 judges that the handover timing is less than a predetermined value, e.g. 2 seconds, or the handover probability is greater than a predetermined value e.g. 0.9.

Preferably, the mobile terminal 10 further periodically notifies the handover processing server 20 of a received signal strength from each access point. When it is judged that received signal strength indicators (RSSIs) from all of the access points are less than a predetermined value, the indication message sending device 803 in the handover processing server 20 sends the second indication message to the mobile terminal 10 to indicate it to determine the handover. In this way, erroneous handovers can be further reduced. An example of such erroneous handovers may happen when the mobile terminal 10 is very close to the handover reference point R1 during the process of moving from Point A to Point B.

According to an embodiment of the present invention, at least one associated edge access point is determined for each handover reference point in the electronic map. Usually, the edge access point is an access point closest to the handover reference point. For example, the access point AP7 is determined as an edge access point associated with the handover reference point R1, and the access points AP10 and AP11 are determined as edge access points associated with the handover reference point R2. In that office, it means that the mobile terminal 10 is far away from the handover reference point when the mobile terminal 10 fails to receive a signal from the edge access point, and thus the probability that handover may happen is low.

Specifically, the following formula can be adopted by the parameter determining device 802 to determine the handover probability p: $p = p_{edge} \times p_{direction}$. Here, $p_{edge}$ represents a probability relating to edge access points. For example, when the mobile terminal 10 fails to receive a signal from any edge access point, $p_{edge}=0$; when it receives a signal from any edge access point, $p_{edge}=1$. And $p_{direction}$ may be a function of the distance d between the mobile terminal 10 and the current handover reference point, and the moving velocity v of the mobile terminal 10 toward the current handover reference point. The value of $p_{direction}$ decreases when the moving velocity v of the mobile terminal 10 toward the current handover reference point decreases, and increases when the distance d between the mobile terminal 10 and the current handover reference point decreases. By design of the formula, the value of the handover probability p can fall in a range from 0 to 1.

The indication message sending device 803 in the handover processing server 20 sends the first indication message to the mobile terminal 10, when it is judged that the handover probability p is greater than a predetermined value.

Preferably, the handover assisting apparatus 800 makes the handover decision according to the received signal strength from the edge access point associated with the current handover reference point received by the mobile terminal 10 as well. For example, assuming the current handover reference point to be R1, the indication message sending device 803 in the handover processing server 20 won't send the second indication message to indicate the mobile terminal 10 to hand over the communication connection from the WIFI network to the GSM network until a received signal strength indicator (RSSI) from the access point AP7 is less than a predetermined value. In this way, erroneous handovers can be further reduced. An example of such erroneous handovers may happen when the mobile terminal 10 is very close to the handover reference point R1 during the process of moving from Point A to Point B.

Those skilled in the art will understand that the so-called apparatus or device in the present invention may be either a hardware device or a software function module, or even a combination of a hardware device and a software function module.

And those skilled in the art will also understand that the more accurate the positioning-related information is in the solutions of the present invention, the exacter decision will be made with respect to the handover between the communication connections associated with the unlicensed mobile access network and the cellular communication network.

The embodiments of the present invention are described above. However, the present invention is not limited to particular systems, equipments and specific protocols. And variations or modifications can be made by those skilled in the art within the scope of the appended claims.

The invention claimed is:

1. An apparatus in a mobile terminal, comprising:
a positioning-related information acquiring device configured to acquire location information, moving direction, and moving velocity of a mobile terminal participating in a communication session via a first communication connection with an unlicensed mobile access network;
a parameter determining device configured to determine handover probability of a handover of the mobile terminal from the unlicensed mobile access network to a cellular communication network at least partly according to the acquired location information, moving direction, and moving velocity;
initiating device configured to initiate a second communication connection between the mobile terminal and the cellular communication network via the unlicensed mobile access network for handover preparation after the determined handover probability is greater than a predetermined probability value; and
an executing device configured to make a decision to handover the mobile terminal from the first communication connection with the unlicensed mobile access network to the second communication connection with the cellular communication network and configured to execute the handover.

2. The apparatus of claim 1, the apparatus further comprising:
an electronic map relating to geographic information within a coverage area of the unlicensed mobile access network, wherein the electronic map comprises at least one handover reference point;
wherein the handover probability determined by the parameter determining device decreases when the moving velocity of the mobile terminal toward the current handover reference point decreases, and increases when the distance between the mobile terminal and the current handover reference point decreases.

3. The apparatus of claim 2, wherein the unlicensed mobile access network comprises at least one access point, and at least one access point closest to each handover reference point is determined for the handover reference point to serve as an edge access point associated with the handover reference point;
wherein the executing device is configured to execute the handover when a received signal strength from the edge access point associated with the current handover reference point received by the mobile terminal is less than a predetermined value.

4. The apparatus of claim 2, wherein the current handover reference point is a handover reference point that is closest to the mobile terminal among the at least one handover reference point.

5. The apparatus of claim 1, wherein the executing device is configured to execute the handover after the second communication connection between the mobile terminal and the cellular communication network is established.

6. The apparatus of claim 1, wherein the unlicensed mobile access network comprises at least one access point;
wherein the executing device is configured to execute the handover when a received signal strength from each access point received by the mobile terminal is less than a predetermined value.

7. The apparatus of claim 1, wherein at least one of the location information, moving direction, and moving velocity of the mobile terminal acquired by the positioning-related information acquiring device are acquired from a global navigation satellite system.

8. The apparatus of claim 1, wherein at least one of the location information, moving direction, and moving velocity of the mobile terminal acquired by the positioning-related information acquiring device are acquired from the unlicensed mobile access network.

9. The apparatus of claim 1, wherein the unlicensed mobile access network comprises a WiFi network.

10. An apparatus in a mobile terminal, comprising:
a positioning-related information acquiring device configured to acquire location information, moving direction, and moving velocity of a mobile terminal participating in a communication session via a first communication connection with an unlicensed mobile access network;
a positioning-related information sending device configured to send a positioning-related message to a handover processing server with the acquired location information, moving direction, and moving velocity of the mobile terminal;
an indication message receiving device configured to receive an indication message from the handover processing server, wherein the indication message is sent by the handover processing server in response to the positioning-related message after the handover processing server determines handover probability of the handover is greater than a predetermined probability value for a handover of the mobile terminal from the unlicensed mobile access network to a cellular communication network, wherein the handover processing server determines handover probability based at least in part on the location information, moving direction, and moving velocity in the positioning-related message, wherein the indication message indicates the mobile terminal should initiate a second communication connection with the cellular communication network for handover preparation;

an initiating device configured to initiate the second communication connection between the mobile terminal and the cellular communication network for handover preparation after receiving the indication message; and an executing device configured to execute the handover of the mobile terminal from the first communication connection with the unlicensed mobile access network to the second communication connection with the cellular communication network.

11. The apparatus of claim 10, wherein the executing device is configured to execute the handover after the second communication connection between the mobile terminal and the cellular communication network is established.

12. The apparatus of claim 10, wherein the indication message receiving device is configured to receive a handover message from the handover processing server, wherein the handover message indicates the mobile terminal should execute the handover;

wherein the executing device is configured to execute the handover according to the handover message.

13. The apparatus of claim 10, wherein the initiating device is configured to initiate the second communication connection via the unlicensed mobile access network.

14. The apparatus of claim 10, wherein the executing device is configured to make a decision to handover the mobile terminal from the first communication connection with the unlicensed mobile access network to the second communication connection with the cellular communication network.

15. An apparatus in a handover processing server, comprising:

a positioning-related information receiving device configured to receive a positioning-related message from a mobile terminal participating in a communication session via a first communication connection with an unlicensed mobile access network, wherein the positioning-related message includes location information, moving direction, and moving velocity of the mobile terminal;

a parameter determining device configured to determine handover probability of a handover of the mobile terminal from the unlicensed mobile access network to a cellular communication network at least partly according to the location information, moving direction, and moving velocity in the positioning-related message; and an indication message sending device configured to send an indication message to the mobile terminal if the determined handover probability is greater than a predetermined probability value to indicate the mobile terminal should initiate a second communication connection with the cellular communication network for handover preparation and execute the handover of the mobile terminal from the first communication connection with the unlicensed mobile access network to the second communication connection with the cellular communication network.

16. The apparatus of claim 15, the apparatus further comprising:

an electronic map relating to geographic information within a coverage area of the unlicensed mobile access network, wherein the electronic map comprises at least one handover reference point;

wherein the handover probability determined by the parameter determining device decreases when the moving velocity of the mobile terminal toward the current handover reference point decreases, and increases when the distance between the mobile terminal and the current handover reference point decreases.

17. The apparatus of claim 16, wherein the current handover reference point is a handover reference point that is closest to the mobile terminal among the at least one handover reference point.

18. The apparatus of claim 16, wherein the unlicensed mobile access network comprises at least one access point, and at least one access point closest to each handover reference point is determined for the handover reference point to serve as an edge access point associated with the handover reference point;

wherein the indication message sending device is further configured to send a handover message to the mobile terminal when a received signal strength from the edge access point associated with the current handover reference point received by the mobile terminal is less than a predetermined value, wherein the handover message is used to indicate the mobile terminal to execute the handover.

19. The apparatus of claim 15, wherein the unlicensed mobile access network comprises at least one access point;

wherein the indication message sending device is further configured to send a handover message to the mobile terminal when a received signal strength from each access point received by the mobile terminal is less than a predetermined value, wherein the handover message is used to indicate the mobile terminal to execute the handover.

20. The apparatus of claim 15, wherein the mobile terminal is configured to initiate the second communication connection between the mobile terminal and the cellular communication network via the unlicensed mobile access network.

21. The apparatus of claim 15, wherein the mobile terminal is configured to make a decision to handover the mobile terminal from the first communication connection with the unlicensed mobile access network to the second communication connection with the cellular communication network.

* * * * *